United States Patent [19]

Tanner

[11] Patent Number: 4,715,268

[45] Date of Patent: Dec. 29, 1987

[54] VENTILATOR DEVICE

[75] Inventor: Robert A. Tanner, Pampisford, England

[73] Assignee: Dixon International Limited, England

[21] Appl. No.: 817,802

[22] Filed: Jan. 10, 1986

Related U.S. Application Data

[63] Continuation of Ser. No. 617,883, Jun. 6, 1984, abandoned.

[30] Foreign Application Priority Data

Jun. 7, 1983 [GB] United Kingdom ................. 8315653

[51] Int. Cl.[4] .......................... F24F 7/00; G05D 23/13

[52] U.S. Cl. ....................................... 98/41.1; 98/41.3; 98/32; 98/37; 98/85

[58] Field of Search ...................... 98/32, 37, 42 R, 85, 98/86, DIG. 8, 41.1, 41.3, 38.6

[56] References Cited

U.S. PATENT DOCUMENTS

| | | | |
|---|---|---|---|
| 1,348,557 | 8/1920 | Forcier | 98/32 |
| 2,936,692 | 5/1960 | White | 98/41.1 |
| 2,939,375 | 6/1960 | Herman | 98/37 |
| 2,974,680 | 3/1981 | Kreuttner | 98/41.1 |
| 3,115,082 | 12/1963 | Sanoff | 98/37 |
| 3,283,691 | 11/1966 | Reiter | 98/86 |
| 3,368,756 | 2/1968 | Edwards | 98/37 |
| 3,426,668 | 2/1969 | Hofmeister et al. | 98/41.3 |
| 3,528,359 | 9/1970 | Sand | 98/41.3 |
| 3,800,687 | 4/1974 | Nozawa | 98/42 |
| 3,923,096 | 12/1975 | van der Lely | 98/32 |
| 3,951,051 | 4/1976 | Dry | 98/85 |
| 4,090,437 | 5/1978 | Bogaert | 98/42 R |
| 4,290,554 | 9/1981 | Hensley | 98/37 |
| 4,328,927 | 5/1982 | McSwain | 98/32 |
| 4,407,187 | 10/1983 | Horney | 98/41.3 |
| 4,519,539 | 5/1985 | Bussjager et al. | 98/41.3 |

FOREIGN PATENT DOCUMENTS

| | | | |
|---|---|---|---|
| 160044 | 12/1979 | Japan | 98/86 |
| 2032272 | 5/1980 | United Kingdom | 98/86 |

*Primary Examiner*—Henry C. Yuen

*Attorney, Agent, or Firm*—Saidman, Sterne, Kessler & Goldstein

[57] ABSTRACT

A ventilator device comprises a casing (2) having one or more openings (3) for passage of ventilation air therethrough, a shutter (7) within the casing and normally held retracted from said one or more openings, first means (15) for urging the shutter to a position to close the one or more openings, and second means (13) actuation of which releases the shutter to cause it to be moved by said first means to close said one or more openings.

9 Claims, 6 Drawing Figures

VENTILATOR DEVICE

This is a continuation of application Ser. No. 617,883, filed June 6, 1984 and now abandonded.

The present invention relates to a ventilator device, which normally allows passage of air but closes in response to a condition, such as the presence of smoke, being detected.

In accordance with the present invention there is provided a ventilator device, comprising a casing having one or more openings within the casing and normally held retracted from said one or more openings, means for urging the shutter to a position to close the one or more openings, and a solenoid or electromagnet actuation of which releases the shutter to cause it to be acted on by said means to close said one or more openings.

By actuation of the solenoid or electromagnet we mean either energization or de-energization depending on the construction of the ventilation device.

The solenoid or electromagnet may be connected to a sensor, such as a smoke sensor, for causing actuation thereof.

The shutter may have one face provided with a sheet of elastomeric material for engaging with the casing and sealingly closing the one or more apertures when the shutter is released.

Alternatively the shutter and the casing may be provided with respective elastomeric sealing members for sealingly closing the one or more apertures when the shutter is released.

Preferably de-energization of the solenoid or electromagnet causes the shutter to be released. Thus the device operates in a failsafe manner, any interrpution of power supply to the solenoid or electromagnet causing the one or more openings in the casing to be closed.

Preferably visual indicating means are provided to show when the shutter has been released. Preferably also such means is connected to the shutter for use in re-setting the shutter, following its release, for it to be held retracted from the one or more openings.

Preferably to allow ventilation air to pass through the casing when the shutter is retracted the shutter is provided with one or more openings therein, such opening or openings being out of communication with the one or more apertures of the casing when said apertures are closed by the shutter.

The invention is further described below by way of example with reference to the accompanying drawings, wherein.

Figure 1:
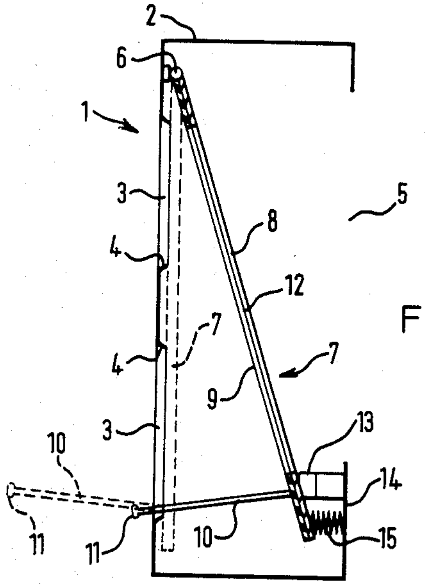
FIG. 1 is a sectional view of a first ventilator device according to the invention.
Figure 2:
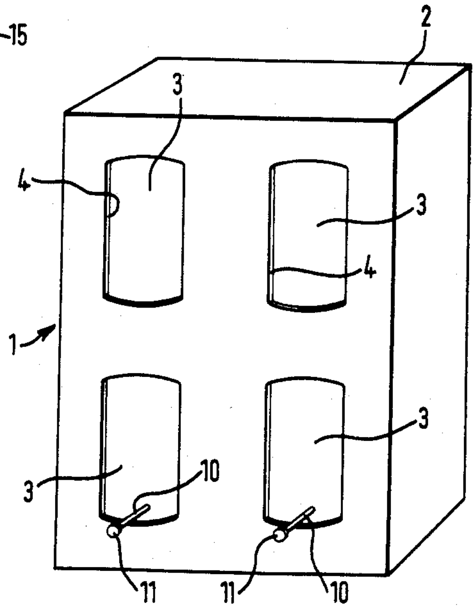
FIG. 2 is a front perspective view of the device.
Figure 3:
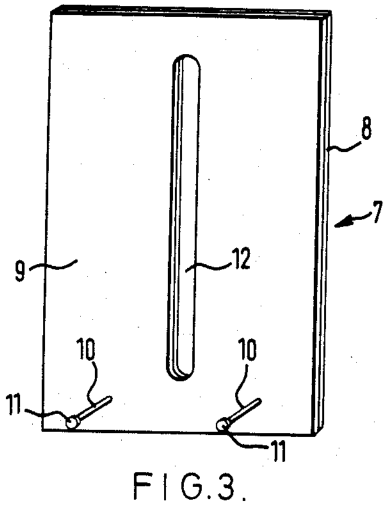
FIG. 3 is a front perspective view of a shutter flap of the device.

Referring to FIGS. 1 to 3, the ventilator device 1 shown therein comprises a box-like casing 2 of generally rectangular shape and having four apertures 3 formed in a front wall thereof, each aperture being bounded by a continuous lip 4 pressed from the front wall of the casing.

The rear of the casing 1 has a large opening 5.

Within the casing 2 and hingedly attached to the casing at a position 6 towards the top of the casing is a flap or shutter 7. The flap 7 comprises a rear steel plate 8 and a front synthetic rubber sheet 9 (e.g. of Neoprene) bonded to the plate. A pair of pins 10 are fixed to the lower portion of the flap 7 and project forwardly from the flap 7 through the two lower apertures 3.

A knob 1 is attached to the free end of each pin 10.

A vertical slot or aperture 12 is formed centrally in the flap 7.

An electromagnet or solenoid 13 is mounted on a rear flange 14 of the casing 2 and when energized can act on the steel plate 8 to hold the flap in a retracted position shown in full lines in FIG. 1. The flap 7 when in its retracted position is spaced from the lips 4 of the apertures 3.

A spring 15 acts between the flange 14 and the flap 7 and, when the flap 7 has been released by the electromagnet 13, urges the flap forwardly to a released position shown in dashed lines in FIG. 1. In this position, the flap 7 is pressed by the spring 15 against the lips 4 of the apertures 3, the sheet 9 sealingly engaging with the lips thereby to close the apertures and the slot 12 being out of communication with the apparatus.

As can be seen, the mating surfaces of flap 7 and the wall of the casing in which apertures 3 are located are generally smooth and are similarly shaped, such that when they are closely juxtaposed in the closed position, an effective seal is formed therebetween.

The electromagnet 13 is connected to a power source (not shown) and a smoke sensor (not shown) so that the electromagnet is normally energized by the power source but when smoke is detected by the smoke sensor the electromagnet is de-energized.

When the electromagnet is energized and the flap 7 is held by the electromagnet in its retracted position, ventilation air can pass readily through the device, the air passing through the apertures 3 and 5 and through the slot 12 in the flap. Some of the ventilation air may also pass around the sides and lower edge of the flap.

When smoke is detected by the smoke sensor, the electromagnet is de-energized. The flap 7 is thereby released and is pressed by the spring 15 against the lips 4 of the apertures 3 to close the apertures thereby to prevent ventilation air passing through the ventilation device. The slot 12 is positioned between and out of registration with the two left apertures 3 and two right apertures 3 as viewed in Figure 2, when the flap 7 has thus been released and so communication between the apertures 3 and the slot 12 is prevented.

As can be seen, the slot 12 is disposed laterally away from apertures 3 so that an effective seal is provided when the flap 7 is in the closed position. The pins 10, projecting forwardly from the casing, provide a visual indication that the device has been activated and that the flap 7 is accordingly in its released position. As noted above, when the flap 7 abuts the front wall of the casing 2, the slot 12 in the flap is out of registration with the apertures 3 in the font wall, closing the ventilator. When the flap 7 is in the open position as shown in FIG. 1, the aperture in flap 7 continues to be out of registration with the apertures 3 in the wall, such that air flow through the slot and the apertures follows a generally serpentine path. Because the flap 7 pivots about fixed axis 6, the alignment of the slot 12 in the flap with respect to the apertures 3 in the casing 1 does not vary between the open and closed positions of flap 7.

To re-set the device after re-energization of the electromagnet 13, the flap 7 is manually pushed by the pins back towards the electromagnet which then holds it in its retracted position. It will be appreciated that re-energization of the electomagnet 13 is not itself sufficient to cause the flap 7 to be retracted.

Figure 4:
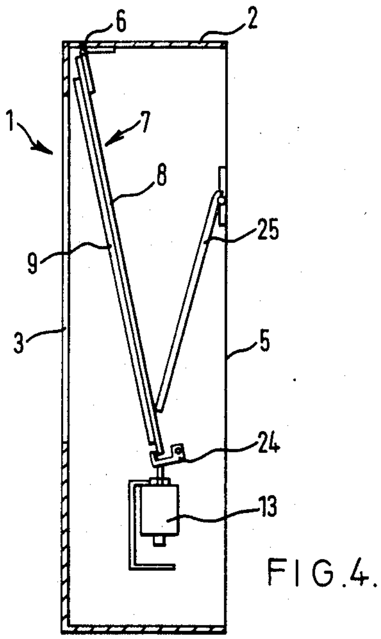
FIG. 4 is a section through a second ventilator device according to the invention.

Referring to FIG. 4, the ventilation device 1 shown therein comprises a box-like casing 2 of generally rectangular shape and having an aperture 3 formed in a front wall thereof. The rear of the casing has an opening 5.

Within the casing 1 and hingedly attached to the casing at 6 is a flap or shutter 7. The flap 7 comprises a rear steel plate 8 and a front synthetic rubber sheet 9 bonded to the plate.

A spring clamp 25 acts between the rear of the casing and the flap 7 to urge the flap forwardly against the front wall of the casing to close the opening 3.

An electromagnet or solenoid 13 is mounted in the casing and its core or armature carries a pivoted catch 24, which normally acts on the lower edge of the flap 7 to hold the flap retracted from the front wall of the casing.

The electromagnet 13 is connected to a power source (not shown) and a smoke sensor (not shown).

Normally the flap 7 is held retracted by the catch 24 and ventilation air can pass through the opening 3 of the casing, around the side and lower edges of the flap 7 and through the opening 5.

When smoke is detected by the smoke sensor, the solenoid 13 is energized to move the catch 24 downwardly thereby to release the flap 7. The flap 7 is then pressed against the front wall of the casing 2 by the spring clamp 25, thereby sealingly closing the opening 3. Ventilation air is thus prevented from passing through the ventilation device.

Alternatively the device may be constructed so that the catch 24 releases the flap 7 when the solenoid 13 is de-energized. In this case, the solenoid is normally energized and when the smoke sensor detects smoke it causes the solenoid to be de-energized.

In the foregoing devices the apertures 3 or the aperture 3 is sealingly closed by the synthetic rubber sheet 8 of the flap 7 engaging the lips 4 of the front wall or the front wall itself.

Figure 5:
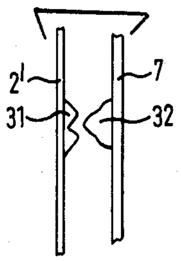
FIG. 5 is a detail of an alternative sealing arrangement for the ventilator devices.

Instead of the sheet 8, as shown in FIG. 5, the front wall 2'. of the casing and the flap 7 may be provided with elastomeric seals 31 and 32 which mate with each other when the flap is released to sealingly close the aperture or apertures 3.

The seals 31 and 32 shown in FIG. 5 may be reversed in position.

Figure 6:
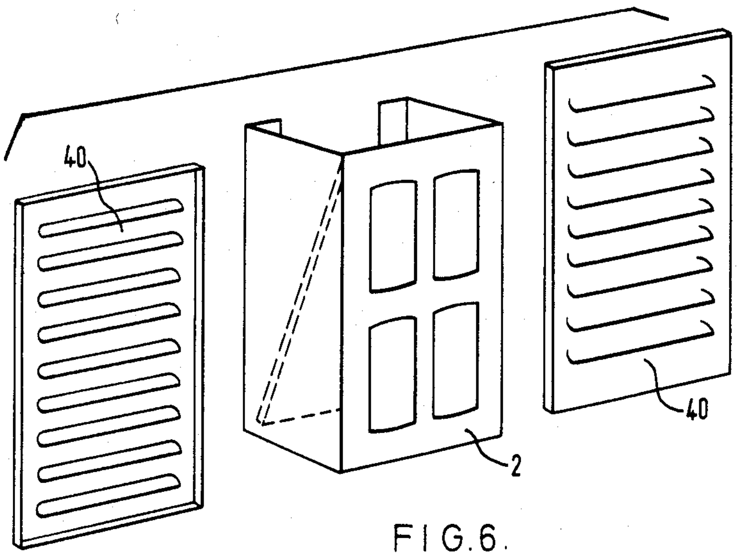
FIG. 6 is an exploded perspective view showing further features of the ventilation devices.

Referring to FIG. 6, the front and rear of the casing 2 of the devices described above may be provided with louvre grilles 40.

The inner surfaces of the grilles i.e. the surfaces adjacent the casing, may be coated with intumescent material, especially on the inner surface of the louvres.

When the ventilation device is subjected to elevated temperatures, as under fire conditions, the intumescent material intumesces (i.e. expands to form a voluminous coherent mass) and thus seals the louvres and generally obstructs passage of air through the device.

Thus even if the sheet 7 or seals 31 and 32 are destroyed or damaged by the heat of the fire, smoke and combustion products are prevented from passing through the device.

In the devices described above, the smoke sensor may be located within the casing of the ventilation device or external to the device. Similarly the power source of the electromagnet or solenoid 13 may be disposed within the casing or external to the device.

The flap 7 may be hinged at one of its sides or at its lower edge instead of at its top edge if desired.

The ventilation devices shown may in use be mounted in an opening in a door, window or wall or at an end of a ventilation duct.

What is claimed is:

1. A ventilator device comprising a casing, said casing including a wall having one or more openings formed therein for passage of ventilation air therethrough, a shutter pivotably mounted within the casing for pivotal movement about a fixed axis between an open position and a closed position, the axis about which said shutter pivots being located such that in said closed position a surface of said shutter is closely juxtaposed to a mating surface of said wall, effectively blocking passage of air through said openings in said wall, and such that in said open position said shutter is substantially displaced from said wall, allowing passage of air through said openings in said wall, said shutter being normally held in said open position, first spring means for urging the shutter to said closed position to close the one or more openings, and second solenoid means actuation of which releases the shutter to cause it to be moved by said first means from the open position to the closed position to close said one or more openings, at least one aperture being formed in said shutter, said at least one aperture being located such that each said aperture is out of registration with the one or more openings in said wall when said shutter is moved to the closed position to close said one or more openings in said casing, and wherein each said aperture is out of registration with said one or more openings in said wall when said shutter is in the open position, such that air flow through said openings in said wall and said aperture in said casing follows a generally serpentine path.

2. A ventilator device according to claim 1, wherein the shutter has one face provided with a sheet of elastomeric material for engaging with the casing and sealingly closing the one or more apertures when the shutter is released.

3. A ventilator device according to claim 1, wherein the shutter and the casing are provided with respective elastomeric sealing members for sealingly closing the one or more apertures when the shutter is released.

4. A ventilator device according to claim 1, provided with visual indicating means to show when the shutter has been released.

5. A ventilator device according to claim 4, wherein the visual indicating means is connected to the shutter for use in re-setting the shutter, following its release, for it to be held retracted from the one or more openings.

6. A ventilator device according to claim 1, wherein the wall has a plurality of openings, the openings in the wall being located laterally away from all of the apertures in the shutter when the shutter is in the closed position.

7. The ventilator device of claim 1, further comprising resilient sealing means operative when said shutter is in the closed position to provide a seal between said wall and said shutter around said one or more openings in said wall.

8. The ventilator device of claim 1 wherein the mating surfaces of said wall and said shutter are generally smooth and are similarly shaped, whereby an effective seal may be formed by their close juxtaposition when said shutter is in the closed position.

9. The ventilator device of claim 8 wherein one of the mating surfaces of said wall and said shutter is formed of an elastomeric material.

* * * * *